US010225400B1

(12) United States Patent
Engelke et al.

(10) Patent No.: US 10,225,400 B1
(45) Date of Patent: Mar. 5, 2019

(54) DUAL COMPATIBILITY PHONE SYSTEM

(71) Applicant: Ultratec, Inc., Madison, WI (US)

(72) Inventors: Robert M. Engelke, Madison, WI (US); Kevin R. Colwell, Middleton, WI (US); Troy Vitek, Waunakee, WI (US)

(73) Assignee: Ultratec, Inc., Madison, WI (US)

( * ) Notice: Subject to any disclaimer, the term of this patent is extended or adjusted under 35 U.S.C. 154(b) by 0 days.

(21) Appl. No.: 15/934,047

(22) Filed: Mar. 23, 2018

Related U.S. Application Data

(62) Division of application No. 14/793,358, filed on Jul. 7, 2015, now Pat. No. 9,955,007.

(60) Provisional application No. 62/021,372, filed on Jul. 7, 2014.

(51) Int. Cl.
*H04M 3/42* (2006.01)
*H04M 3/22* (2006.01)
*H04M 7/00* (2006.01)
*H04M 7/12* (2006.01)

(52) U.S. Cl.
CPC ..... *H04M 3/42391* (2013.01); *H04M 3/2209* (2013.01); *H04M 7/0042* (2013.01); *H04M 7/125* (2013.01); *H04M 7/1285* (2013.01); *H04M 7/1295* (2013.01)

(58) Field of Classification Search
None
See application file for complete search history.

(56) References Cited

U.S. PATENT DOCUMENTS

| 2003/0050039 | A1 | 3/2003 | Baba et al. |
| 2005/0210395 | A1 | 9/2005 | Wakita et al. |
| 2005/0226394 | A1* | 10/2005 | Engelke ............ H04M 3/42391 379/52 |
| 2007/0036282 | A1 | 2/2007 | Engelke et al. |
| 2008/0112392 | A1 | 5/2008 | Mansfield |
| 2008/0187108 | A1 | 8/2008 | Engelke et al. |
| 2009/0046696 | A1* | 2/2009 | Shi ........................ H04M 1/505 370/347 |
| 2011/0170672 | A1 | 7/2011 | Engelke et al. |

* cited by examiner

*Primary Examiner* — Otis L Thompson, Jr.
(74) *Attorney, Agent, or Firm* — Quarles & Brady LLP

(57) ABSTRACT

A method of operating a captioned telephone, comprising storing analog test data in a captioned telephone memory, dialing a telephone number to a relay gateway, connecting to the relay gateway over a communication network and performing a test of the communication network quality using the test data to determine if the network is sufficient to carry analog data, the test including at least one of transmitting the test data to the relay gateway and receiving test data from the relay gateway via the communication network, wherein the network is one of a POTS network and a VOIP network.

20 Claims, 11 Drawing Sheets

DUAL COMPATIBILITY PHONE SYSTEM

CROSS REFERENCE TO RELATED APPLICATIONS

This application is a divisional of U.S. application Ser. No. 14/793,358, which was filed on Jul. 7, 2015 and is titled "Dual Compatibility Phone System," which claims priority to U.S. provisional patent application No. 62/021,372, which was filed on Jul. 7, 2014, and is titled "Dual Compatibility Phone System," the contents of both applications being incorporated herein in their entirety by reference.

STATEMENT REGARDING FEDERALLY SPONSORED RESEARCH

Not applicable.

BACKGROUND OF THE DISCLOSURE

The disclosure relates to relay systems for providing voice-to-text captioning for hearing impaired users and, more particularly, to a relay system that is compatible with both analog public switched telephone networks and voice over internet protocol (VOIP) telephone service.

Communication systems that support telephone type communications generally take two different forms. A first form referred to as a public switched telephone network (PSTN) uses what's called circuit-switched telephone. This technology works by setting up a dedicated channel (or circuit) between two points for the duration of a call. These telephony systems are based on copper wires carrying analog voice data over dedicated circuits.

The second form which has developed more recently and is referred to as voice over internet protocol (VOIP) is based on digital technologies. VOIP, in contrast to PSTN, uses what is called packet-switched telephone technology. Using this system, voice information travels to its destination in many individual network packets across the Internet. VOIP service is designed to carry voices and dual tone multi-frequency (DTMF) signaling used by a network. However, internet protocol (IP) communication systems do not reliably carry analog data signals (e.g., data signals generated by a modem).

Captioned telephone devices (e.g., a CapTel device) and a captioned telephone system have been developed for providing text transcription of voice communications during a telephone call to hearing impaired assisted users. To this end, a typical captioned telephone device (e.g., an "assisted user's device") may include a processor, a speaker, a microphone and a display screen and a captioned telephone system may include a relay. When a telephone call occurs between an assisted user using the assisted user's device and another person (hereinafter a "hearing user" using a "hearing user's device") and captioning is required, a link is made to the relay so that the hearing user's voice signal can be provided to the relay to be transcribed into text and so that the text can be transmitted back to the assisted user's device. The hearing user's voice is broadcast to the assisted user via the speaker and the assisted user's voice is picked up by the microphone and transmitted to the hearing user's device. The transcribed text is presented to the assisted user via the display to view. The transcription and transmission of text is rapid and therefore the text and hearing user's voice signal are presented to the assisted user substantially or close to simultaneously.

There are two general types of assisted user's devices including one line and two line devices. In the case of a one line device, the relay operates between the hearing user's device and the assisted user's device to transcribe the hearing user's voice to text. Thus, a hearing user that dials a phone number associated with an assisted user may be connected first to a relay and the relay may initiate a second connection to the assisted user's device. In this case the hearing user's voice and the assisted user's voice signal travel through the relay to the other user's devices and the text is transmitted form the relay to the assisted user's device directly.

In the case of a two line device, the hearing user's device and the assisted user's device are linked directly to each other for voice communications and the assisted user's device initiates a second link (e.g., the second line in the two line system) to the relay to transmit the hearing user's voice to the relay and receive text back from the relay to present via the display screen.

Captioned phone devices have been extremely successful in the market and have become invaluable tools for hearing impaired users to communicate with other people. One issue with captioned services is that the assisted user's devices and the relay service have costs associated therewith that are over and above the typical costs associated with telephone devices and services used by hearing users. For this reason government agencies have stepped up and often pay for or at least offset some of the additional costs associated with captioning service and the captioning system. For instance, government agencies oftentimes either purchase assisted user devices and distribute those devices to assisted users directly or pay a substantial part of the device purchase price for the assisted users. As another instance, most relay service is funded by a state or the FCC so that, once an assisted user has an assisted user's device, the service is essentially free to the assisted user.

States regulate intrastate telecommunications and all state regulated telecommunications are based on PSTN technology. To provide captioned telephone services, most states have set up telephone equipment distribution programs (EDPs) that purchase assisted user devices and distribute those devices to assisted users that meet qualification requirements set by the state.

The Federal Communications Commission (FCC) regulates interstate services including VOIP based services. Thus, all VOIP telecommunications are regulated by the FCC on a national level. The FCC does not directly purchase assisted user devices and instead allows assisted users to purchase captioned phone devices directly from manufacturers or service providers. The FCC, however, requires that any person wanting to use VOIP captioning service register and certify with the FCC that they require captioning service in order to communicate via a telephone type conversation. The FCC requirements for using captioning services are different than the state requirements.

Because different assisted users have different types of phone service (e.g., PSTN or VOIP), two different types of assisted user devices have been developed, one for use with PSTN service and a second for use with VOIP service.

For many years the US telephone network has been migrating from an analog PSTN system to a VOIP based system for several reasons. First, the internet is generally unregulated and VOIP is less regulated than the PSTN system. Second, VOIP providers have more marketing flexibility and less regulatory overhead than do the traditional wire line companies. Third, VOIP equipment is less expensive to purchase and operate than the traditional PSTN equipment. Moreover, the operating costs are lower for VOIP service than for PSTN services.

When a PSTN based assisted user's device is connected to an IP link, because VOIP does not reliably handle analog data (e.g., modem generated) signals used by the PSTN based device, the PSTN based assisted user's device does not work well. Thus, if an assisted user obtains a PSTN based device and attempts to use that device with a VOIP communication link, captioning results are poor in most cases and the service and device may not be used. Similarly, when an assisted user's telephone service changes from PSTN to VOIP, because IP does not reliably handle analog data signals, a PSTN based assisted user's device becomes unreliable and therefore obsolete. For this reason, while state run EDPs still want to provide captioned telephone devices and services to their residents, the EDPs are reluctant to purchase PSTN based devices that may be rendered obsolete by PSTN to VOIP service migration.

Currently, PSTN based captioned services make use of telephone network signaling to determine the originating and terminating locations for each relay call and, therefore, who has jurisdiction over the call. In one example, a determination may be made as to whether a call is an intrastate, interstate, international, or toll free call. If a determination is made that a call is an intrastate call, a determination may be made as to which state the call originated from and therefore which state has jurisdiction over and regulates the call. With current VOIP technology it is not possible to reliably determine the location of each end point of a call. VOIP based captioned devices cannot reliably provide communication end point information because most IP addresses are dynamically assigned and are not related to a linking communication line.

Nevertheless, the states and the FCC would like to have the same type of summary reports for VOIP based captioned calls that they get for PSTN based captioned calls showing the various call types as described above.

Thus, there is a need for a captioned assisted user's device that can be used with either of PSTN or VOIP communication systems. There is also a need for a captioned assisted user's device and service that will not become obsolete when the underlying technology used to handle communications migrates from PSTN to VOIP. There is also a need for an assisted user's device that can automate the process of determining if a user's device should be set up for VOIP or PSTN service and that can help the assisted user provide required information for using different communication services when needed. There is further a need for a system where information required to establish the location of an assisted user's device is available regardless of the underlying technology used by the device to facilitate communications.

SUMMARY OF THE DISCLOSURE

The present invention overcomes the aforementioned drawbacks by providing a dual compatibility CapTel phone (DCCP) that is compatible with both analog PSTN telephone service and VOIP telephone service. To this end, at least some DCCPs have been developed that include both a conventional PSTN port and at least one Ethernet connection port. Here, when the DCCP is to be used with PSTN service, the DCCP may be set up as a single line assisted user's device where the DCCP links to a relay via the single PSTN port. In this case a hearing user's device links to the relay when the hearing user calls the assisted user and the relay completes the connection to the assisted user's device via the PSTN port.

When the DCCP is to be used with VOIP service, the DCCP is set up as a two line assisted user's device where a call with a hearing user is linked to the PSTN port via a network router (e.g., a router at the assisted user's residence) or the like for hearing user and assisted user voice communications and the DCCP is linked to the relay via the Ethernet connection port to transmit the hearing user's voice to the relay and to receive transcribed text back from the relay. Here, by providing one PSTN link and one Ethernet link, the single DCCP can be set up for use as either a one line device using the PSTN communication protocol or a two line device using VOIP protocol in an IP mode of operation.

In at least some cases, when a DCCP is installed and during a commissioning procedure, the DCCP is programmed to automatically perform a test on a linked phone line to determine which type of communication mode the DCCP should communicate in, the PSTN mode or the IP mode (e.g., via VOIP for voice and IP for text reception).

In at least some cases, the test will include a line quality test to determine if the line is capable of carrying sufficiently high quality analog data signals between the relay and the assisted user's DCCP. Where line quality is sufficient to carry analog data signals to and from a relay, in at least some cases the default operating mode will be the PSTN mode. Here, if the line quality is insufficient to carry analog data signals, the operating mode may be set to the IP (e.g., VOIP) mode. Other tests to assess an optimal communication mode are contemplated.

To perform an exemplary line quality test, during a commissioning procedure, the DCCP may be programmed to dial a relay gateway that is set up to help determine line quality and line quality test data may be transmitted one or both ways on the line and the received test data may be compared to known correct data to assess line quality. Where line quality is sufficient, the DCCP may configure itself to communicate as a single line device using the PSTN communication protocol. Here, in addition to configuring itself as a single line device, the DCCP may signal to a system server to operate as a single line PSTN device so that incoming calls to the assisted user are automatically routed through the relay and so that outgoing calls are likewise automatically routed through the relay.

In accordance with another aspect of the present disclosure, an assisted user's device may also be programmed to automatically configure itself with specific operating parameters that are prescribed by a regulating entity (e.g., a state EDP, the FCC, etc.) upon commissioning. For example, the disclosure contemplates a method for operating a DCCP including the DCCP dialing a telephone number, connecting to a relay configuration gateway over a network, executing a DTMF protocol, and obtaining configuration data from the gateway for configuring the DCCP. Here, the network may be either one of a PSTN and a VOIP network, and the configuration data is obtained independent of the network type.

In accordance with another aspect of the present disclosure, a method for operating a DCCP includes receiving configuration data from a configuration gateway over a network, performing a reliability or line quality test to determine if a telephone line will support a reliable dialup PSTN data connection, and determining if the reliability test was successful or unsuccessful. Again, the network may be either of a PSTN and a VOIP network.

In accordance with another aspect of the present disclosure, a method for operating a DCCP includes contacting an authorized agent, verifying a registration for one of a PSTN mode and a VOIP network mode, and remotely changing a configuration of the DCCP from one of the PSTN mode and the VOIP mode to the other of the PSTN mode and the VOIP network. In other cases the task of confirming registration and changing communication modes may be automated.

In accordance with another aspect of the present disclosure, a method for operating a DCCP includes automatically dialing a phone number with a captioned telephone, reporting with a DTMF protocol at least one of an electronic serial number associated with a DCCP and a calling party number associated with a call, and recording the electronic serial number and the calling party number or DCCP location determined from the calling party number.

The foregoing and other aspects and advantages of the invention will appear from the following description. In the description, reference is made to the accompanying drawings which form a part hereof, and in which there is shown by way of illustration a preferred embodiment of the invention. Such embodiment does not necessarily represent the full scope of the invention, however, and reference is made therefore to the claims and herein for interpreting the scope of the invention.

DETAILED DESCRIPTION OF THE DISCLOSURE

The present invention is presented in several varying embodiments in the following description with reference to the figures, in which like numbers represent the same or similar elements. Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

The described features, structures, or characteristics of the invention may be combined in any suitable manner in one or more embodiments. In the following description, numerous specific details are recited to provide a thorough understanding of embodiments of the system. One skilled in the relevant art will recognize, however, that the system and method may both be practiced without one or more of the specific details, or with other methods, components, materials, and so forth. In other instances, well-known structures, materials, or operations are not shown or described in detail to avoid obscuring aspects of the invention.

Figure 1:
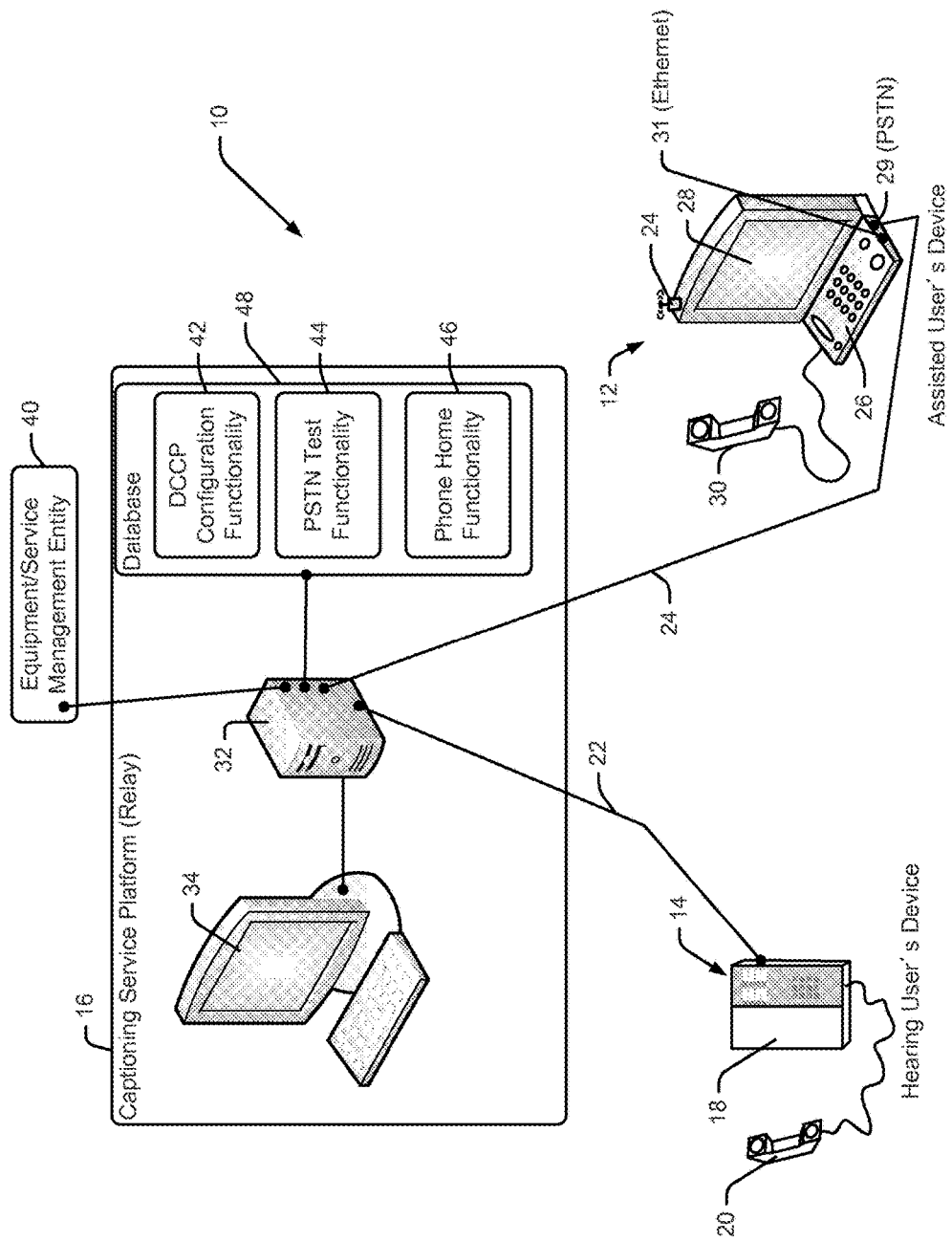
FIG. 1 is a schematic diagram illustrating various components in a captioning communication system that are linked together to facilitate single line captioning using a PSTN mode of operation.

Referring to FIG. 1, the present invention will be described in the context of an exemplary communication system 10 including a CapTel service platform or relay 16, an assisted user's (AU's) dual compatibility CapTel phone device 12, a hearing user's device 14 and an equipment and service management entity (e.g., an EDP, the FCC, a device distributor, a caption service provider, etc.). The hearing user's device 14 may be a conventional telephone including a phone device 18 and a handset 20 that includes a speaker and a microphone (not separately labeled). The service entity 40 is an entity that regulates caption call operating characteristics.

Figure 3:
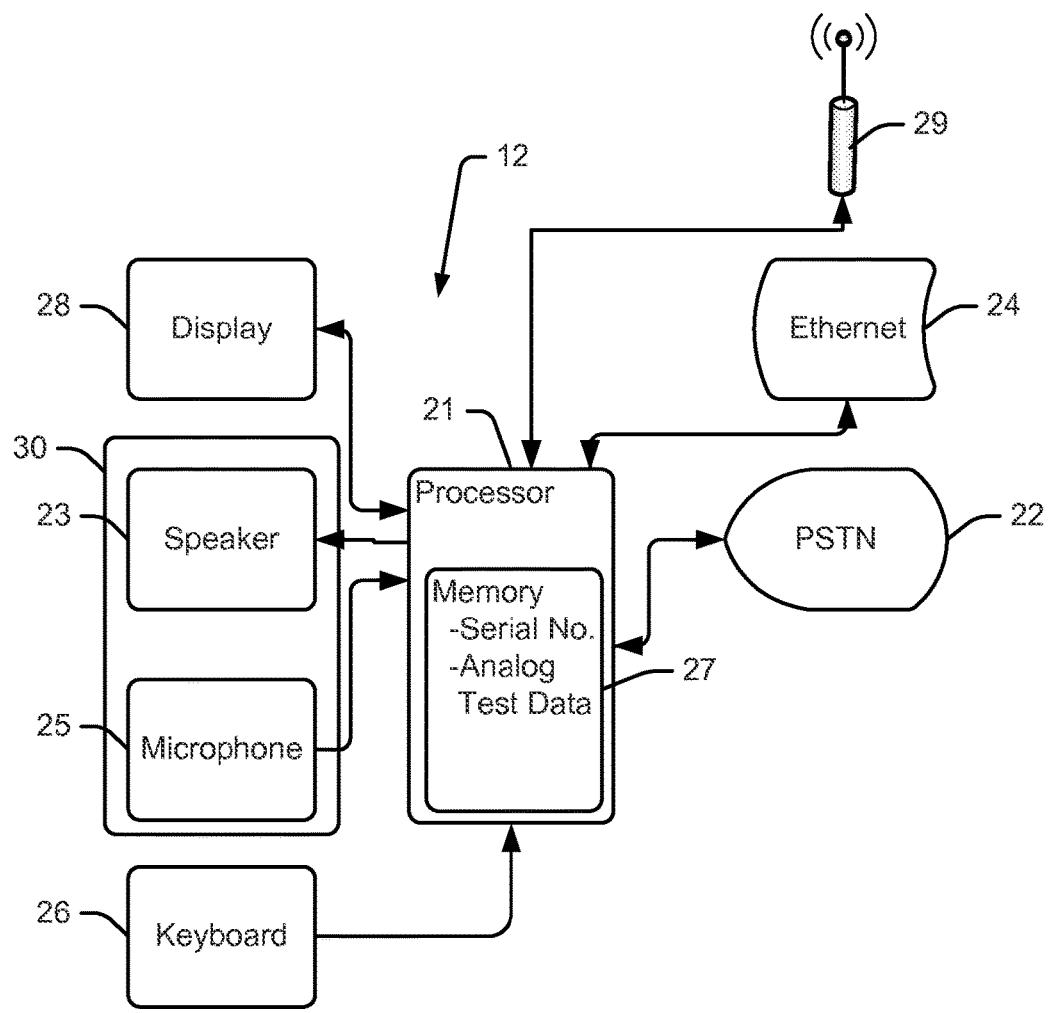
FIG. 3 is a schematic diagram illustrating the components that make up an exemplary dual compatibility CapTel phone (DCCP) shown in each of FIGS. 1 and 2.

Referring still to FIG. 1 and also to FIG. 3, exemplary DCCP 12 includes a processor 21, a display 28, a handset 30 including a speaker 23 and a microphone 25 and a keyboard 26. Exemplary device 12 also includes a conventional PSTN port or link 22 and an Ethernet link 24. In some cases, device 12 will also include a WIFI wireless communication transceiver 29. DCCP 12 also includes a memory or device database or has access to such a database 27. In at least some embodiments a DCCP specific serial number may be stored in memory 27 prior to shipping to an entity 40 or an end assisted user that can be used to uniquely identify the DCCP. In other cases, variable DCCP settings may be stored in memory 27 prior to shipping when jurisdiction or regulating entity (e.g., an EDP) specific setting values are known prior to shipping. In some cases, analog test data useful for assessing quality of a PSTN connection will also be stored in memory 27. In some cases applications run by processor 21 to provide interface screen shots and receive input via the DCCP display screen as well as to manage other processes and method described herein may also be stored in memory 27.

Referring again to FIG. 1, exemplary relay 16 includes a server 32 and a database 48 storing system programs and applications as well as various types of data used by the relay and overall CapTel platform to perform various functions. One primary function of the relay is to receive a hearing user's voice signal from device 12 and transcribe that signal into text which is then returned to device 12 to be presented via display 24 to an assisted user. In some cases the transcription process may be automated using voice recognition software run by server 32. In other cases the transcription may be performed by a call assistant using a terminal 34 linked to server 32. Here, the call assistant would listen to a voice of a hearing user and transcribe that voice signal to text. In some cases the call assistant will use voice to text transcription software trained to the specific voice of the call assistant to perform transcription.

While relay 16 is described as including server 32, server 32 may comprise any type of computing device or a set of networked servers or other types of processors, each of which may be programmed to perform different processes or sub-processes as described hereafter. While different systems may include different processing devices and combinations, the processors or computing devices associated with relay 16 will be referred to as "relay" hereafter unless indicated otherwise.

In addition to the transcription function, relay 16 performs other functions described hereafter. Specifically, relay 16 may perform DCCP configuration functions, PSTN test functions and phone home functions represented in FIG. 1 by database blocks 42, 44 and 46, respectively.

To assist EDPs with obsolescence issues created by the telephone network migration from PSTN technology to VOIP technology, the exemplary DCCP in the present disclosure may be programmed or controlled to operate as either a PSTN CapTel phone or a VOIP CapTel phone. If a user's telephone service will support PSTN equipment, then the DCCP may be installed to operate as a PSTN CapTel phone. On the other hand, if the user's telephone service is VOIP based or is later changed to VOIP or cannot support PSTN equipment, the DCCP may be installed to or switched to operate as a VOIP or IP CapTel phone. In this way EDPs have some assurance that Captel assisted user devices they provide to assisted users will not become obsolete because of the migration from PSTN to VOIP telephone service.

Referring again to FIG. 1, when DCCP 12 is installed to operate as a PSTN device, DCCP 12 is programmed to receive the hearing user's voice signal via the PSTN input port 29 and to broadcast that signal via the device 12 speaker to the assisted user. DCCP 12 is also programmed to receive the assisted user's voice signal via the device 12 microphone and to transmit that analog voice signal to relay server 32 via the PSTN port 29. Here, a hearing user's device 14 links directly to the relay 16 via a phone or other communication line 22 and the hearing user's voice is transmitted to server 32 for transcription to text and to be forwarded on to DCCP via line 24 for broadcast. The transcribed text is transmitted as analog PSTN type data on line 24 to DCCP via PSTN port 29 to be presented on the DCCP display screen 28. In this single line PSTN mode of operation, the Ethernet port 31 is unused.

Figure 2:
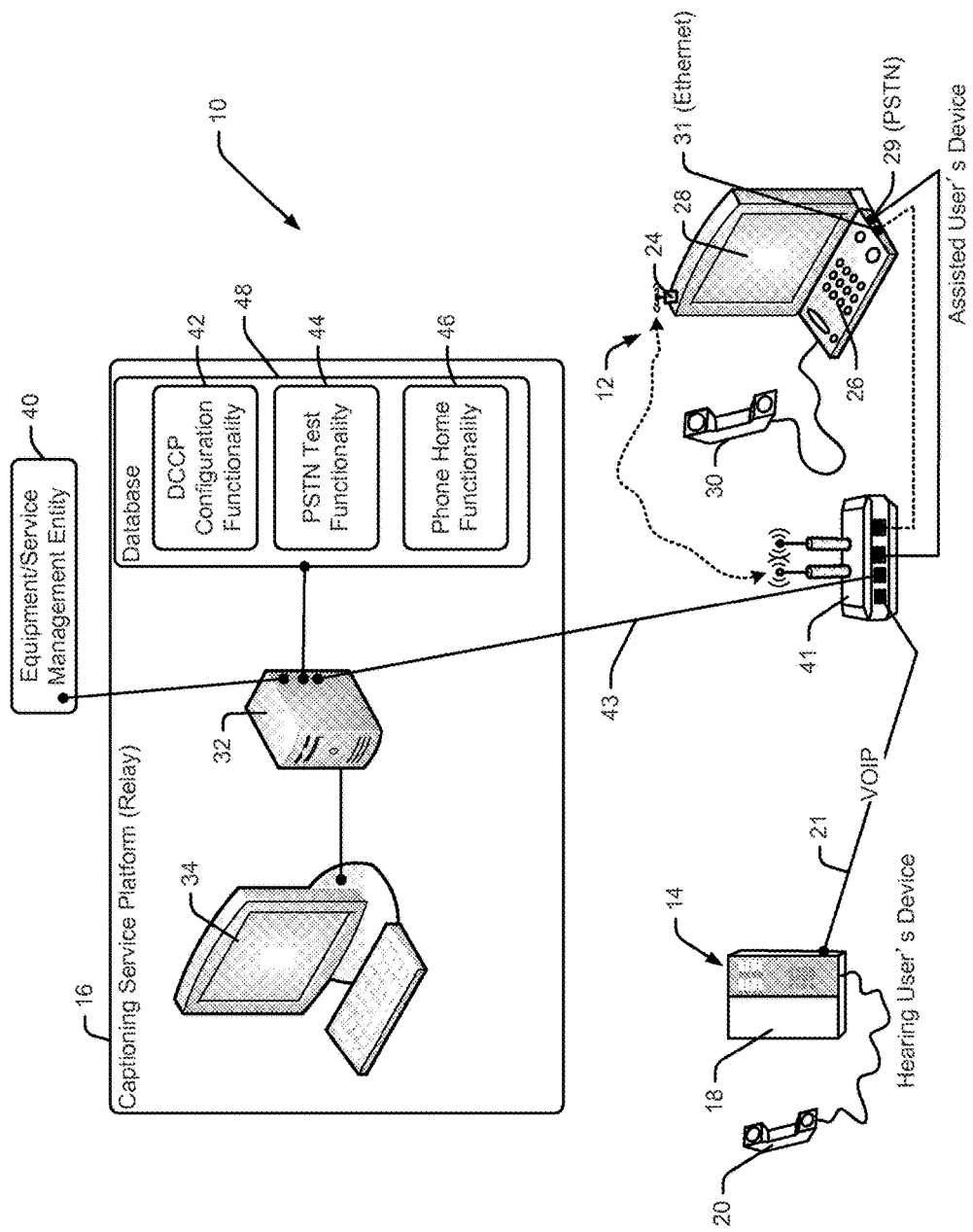
FIG. 2 is a schematic diagram illustrating various components in a captioning communication system that are linked together to facilitate two line captioning using an IP mode of operation.

Referring to FIG. 2, when DCCP 12 is installed to operate as a VOIP device, a hearing user's device 14 is linked directly to the DCCP via an internet connection or link 21 into a network router 41 (e.g., a router at the assisted user's residence) and a line to the PSTN port 29 on DCCP 12. Similarly the assisted user's voice signal is transmitted through router 41 to the hearing user's device 14 to be broadcast to the hearing user. Here, the assisted user's voice signal may be sent to the router 41 either via the PSTN port 29 or via a link from Ethernet port 31 to the router 41.

In addition to transmitting the assisted user's voice signal to router 41 to be sent on to the hearing user's device 14, DCCP also transmits the hearing user's voice signal back through router 41 and on to relay server 32 via an IP link 43 (e.g., via VOIP). Again, relay 16 converts the hearing user's voice signal to text and transmits that text via an IP or other robust network protocol back to DCCP 12 via router 41 on link 43. Here, router 41 transmits the text to DCCP 12 via port 31. DCCP converts the text message into text and presents the text via display 28.

In some cases where VOIP or another network protocol is used to communicate with server 32, DCCP 24 may communicate with router 41 wirelessly via transceiver 24. Here, a paring of DCCP with router 41 is required prior to wireless communication as well known in the networking arts. In other cases it is contemplated that other line tests may be performed in order to assess which type of mode (PSTN or IP) should be used by the DCCP. For instance, in some cases it is contemplated that a DCCP may be able to attempt to communicate with router 41 to identify that the router exists. Here, where no router responds to a communication from the DCCP, the DCCP may be programmed to determine that no router exists and therefore that the DCCP should be set to operate in the PSTN mode. If a router 41 responds to a message from DCCP 12, DCCP 12 may be programmed to recognize that VOIP service is present and may set itself to operate in the IP mode. Other tests for determining operation mode type are contemplated.

In one aspect, the DCCP may provide several advantages over a typical CapTel phone with respect to configuration of the DCCP during installation. When a DCCP is installed it may automatically connect to a special gateway associated with relay 16, identify itself, and relay 16 may supply the DCCP with specific configuration information required by a state program (e.g., an EDP) that provided the DCCP to the assisted user. To this end, EDPs often establish default settings for a number of parameters in a CapTel phone. These parameters may include a Captions Default to ON setting, a maximum allowed handset volume with captions OFF setting, and other similar features.

Unique serial numbers are typically assigned to DCCPs. In at least some cases, prior to shipping a DCCP to an EDP or directly to an assisted user, a unique DCCP serial number may be entered into a relay database along with the settings specified by the EDP or for another entity that is to regulate the DCCP. At installation the DCCP may be automatically configured with the appropriate settings.

For a PSTN phone, the connection to the relay gateway may be via a dialup data connection. For an IP CapTel phone the connection to the configuration gateway may be via the internet. The DCCP is designed for an environment where it is not known if a connection to a relay has the ability to support the dialup data connection or not. It may be that the telephone service at the install location is VOIP and may not support a reliable dialup data connection. If the install location cannot establish a reliable PSTN data connection, then a conventional PSTN based CapTel device may not be able to establish a reliable connection to the configuration gateway and could not complete the install configuration.

To overcome this problem a DCCP may connect to the relay configuration gateway by dialing a telephone number and may then use a unique DTMF protocol to communicate with the configuration gateway. PSTN lines accurately carry DTMF. Similarly, all VOIP lines are designed to accurately carry DTMF. Thus, by using a DTMF protocol to facilitate the configuration process, the DCCP may be assured of receiving configuration data whether a user's telephone service is PSTN (e.g., POTS) or VOIP and the user does not have to be aware of which service the user employs.

Figure 4:
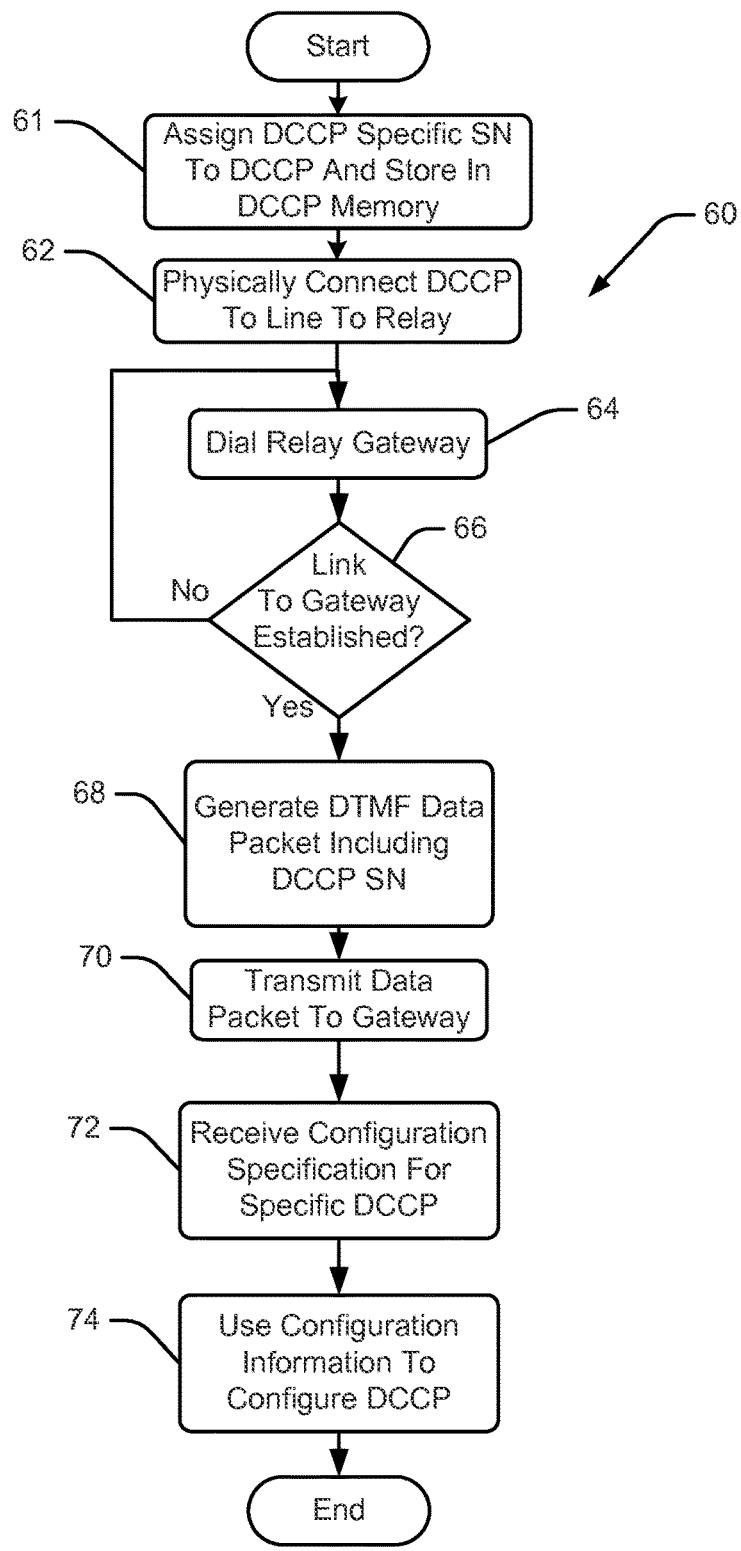
FIG. 4 is a flow chart illustrating steps performed by an exemplary DCCP during a DCCP commissioning procedure.
Figure 5:
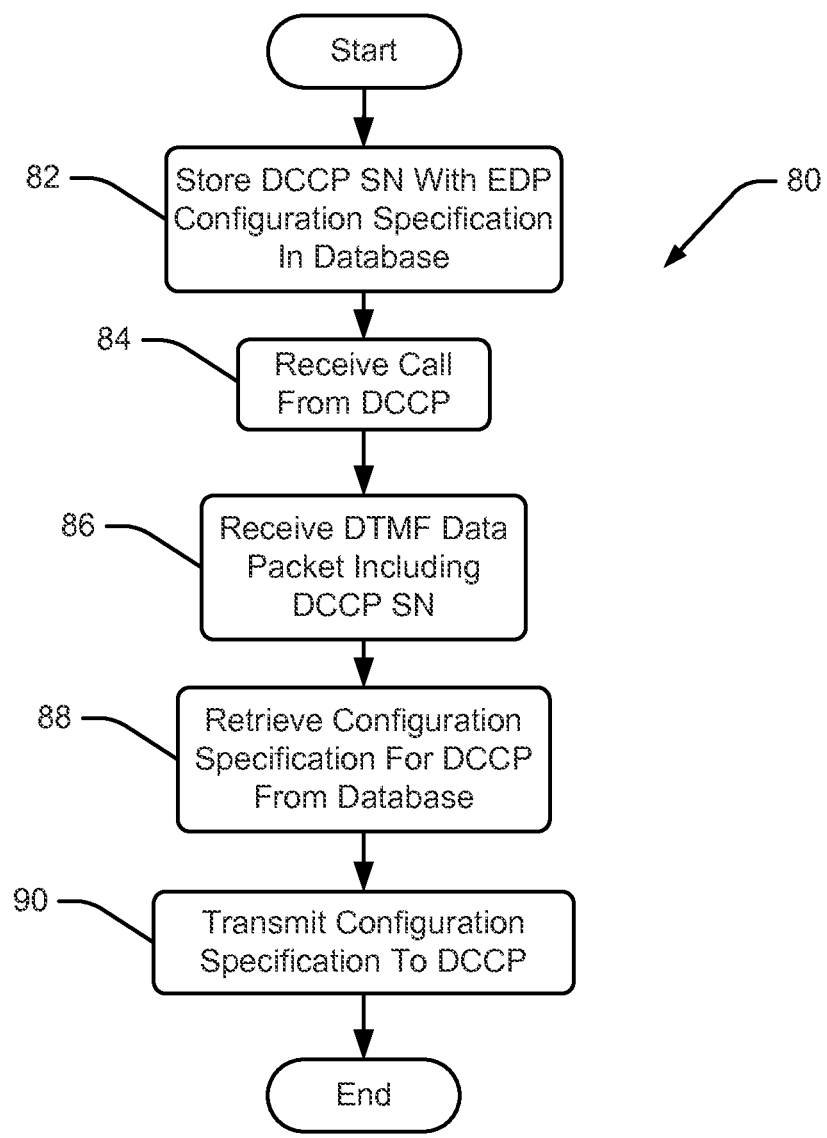
FIG. 5 is a flow chart showing steps performed by a relay or relay gateway during a DCCP commissioning procedure.

Referring now to FIGS. 4 and 5, an exemplary process 60, 80 for configuring a DCCP during an installation process or commissioning procedure is illustrated where FIG. 5 represents steps performed by a relay or platform gateway and FIG. 4 presents steps performed by a DCCP. Beginning at block 61 in FIG. 4, a DCCP specific serial number is assigned to a DCCP and stored in the DCCP memory that can be used to subsequently distinguish the associated DCCP from other DCCPs. At block 82 in FIG. 5 the DCCP specific serial number is stored by relay server 32 or other platform computing device along with a configuration specification for the specific DCCP. Here, again, a state or other entity regulating DCCP use or that provides the DCCP to a user may provide specific configuration requirements.

In FIG. 4, at block 62, an assisted user connects a phone line in the user's residence or at the location at which DCCP 12 is to be used to the PSTN port 29. At block 64, DCCP 12 dials a phone number associated with the relay 16. Here, the process of dialing the relay upon initial link to the communication line may be automated so that an installer does not have to initiate the process. After a DCCP to rely link has been established at block 66, control passes to block 68 where the DCCP processor automatically generates a DTMF data packet including the DCCP specific device serial number and at block 70 the DTMF packet is transmitted to relay 16.

Referring again to FIG. 5, the DCCP connection is made at block 84 and the DTMF packet is received at block 86. At block 88, relay server 32 or the like access the DCCP serial number database created at block 82 and identifies a configuration specification for the DCCP serial number received at block 86. At block 90 the configuration specification information is transmitted back to the DCCP.

Referring again to FIG. 4, at block 72 the configuration specification is received and at block 74 that specification is used by DCCP to set variable operating parameters to values or settings consistent with the specification requirements. Many settings are contemplated including default captioning on or off settings, maximum volume settings, etc.

According to another aspect, the DCCP may automatically determine if a telephone line can support a reliable dialup connection by assessing line quality or reliability. A state EDP may prefer that a resident use PSTN communication if the user's telephone service will support a reliable PSTN connection. In the alternative, another state may prefer that their residents use an IP connection for receiving captioning services if telephone service will support an IP connection. DCCP 12 may cooperate with relay 16 to perform a telephone line reliability test. The test may determine if the user's telephone line will support a reliable dialup data connection to the CapTel service. To this end, again, most IP connections or lines will not allow high fidelity transmission of analog data signals and therefore will not support a reliable dial up data connection. If the test is successful, the DCCP may continue with the PSTN install. However, if the test is unsuccessful, the DCCP may direct the installer to set up the DCCP to operate using an IP mode of operation.

To test the telephone line quality, in at least some embodiments, the DCCP may dial into a special relay number associated with a special set of platform modems that are programmed to perform a series of loopback tests with the DCCP. One or more modems may send packets of data to the DCCP. In at least some cases the DCCP may retransmit the received test packets back to the modem or modems. The platform modems and/or DCCP may examine the test data packets and identify any errors in packet data. If the error rate is sufficiently low, the DCCP or modem processor may assess that the line quality is sufficiently high for PSTN communication. On the other hand, if the error rate exceeds some threshold level, the DCCP or modem processor may assess that the line quality is poor and insufficient to support PSTN communications and a process to set up the IP mode of communication may be initiated.

In other cases a DCCP may send test packets to the platform modem or modems to start a line reliability test. In some cases the modem may retransmit the packets, including errors, back to the DCCP. One or both of the modems and DCCP may examine the received test packets to identify errors and assess if the line quality error threshold has been exceeded or not.

In one aspect, the test modem may also provide additional data on the quality of the data connections. This data may include equalization and power parameters used by the modem to complete the connection.

Figure 6:
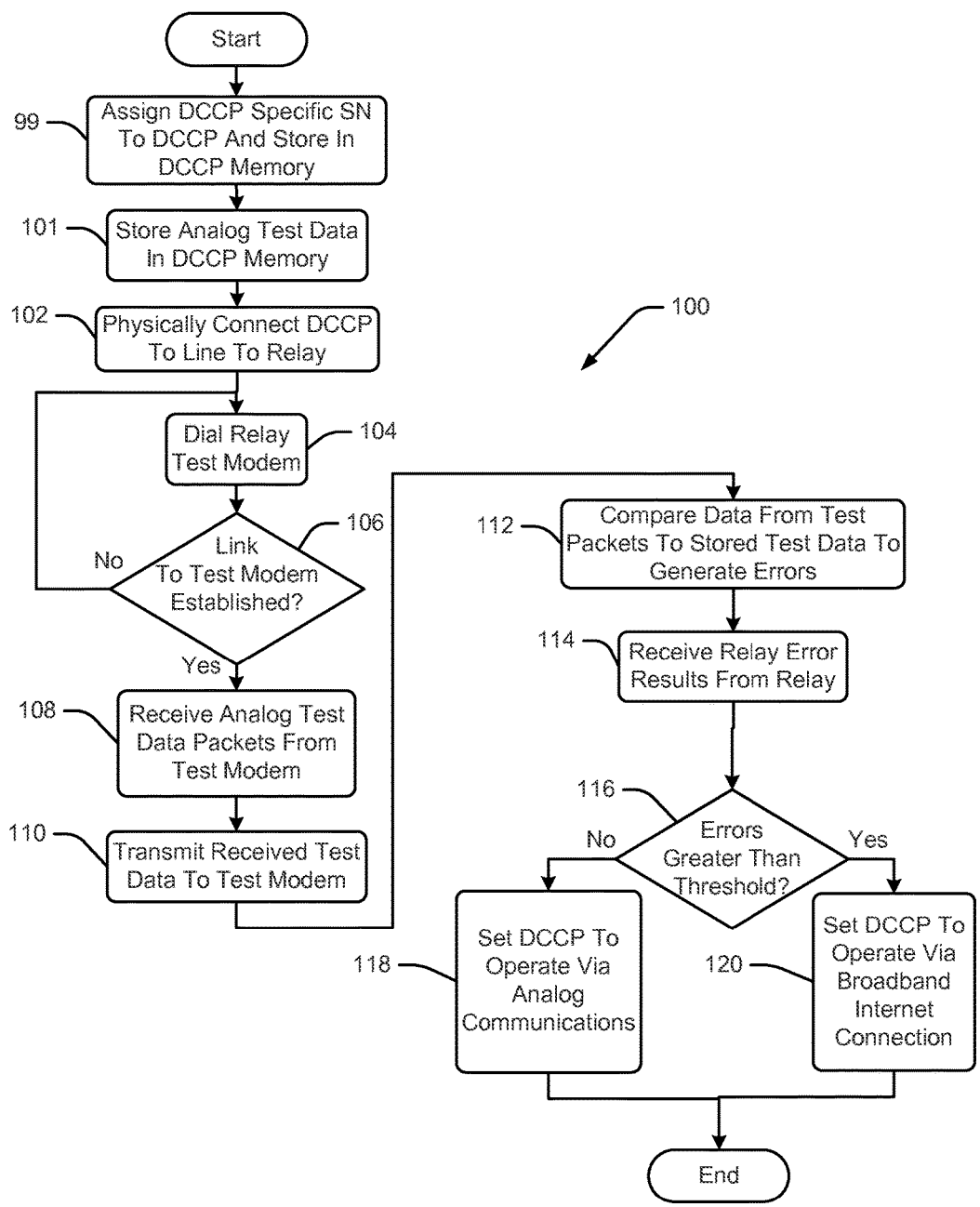
FIG. 6 is a flow chart illustrating steps performed by an exemplary DCCP during a line quality test procedure.
Figure 7:
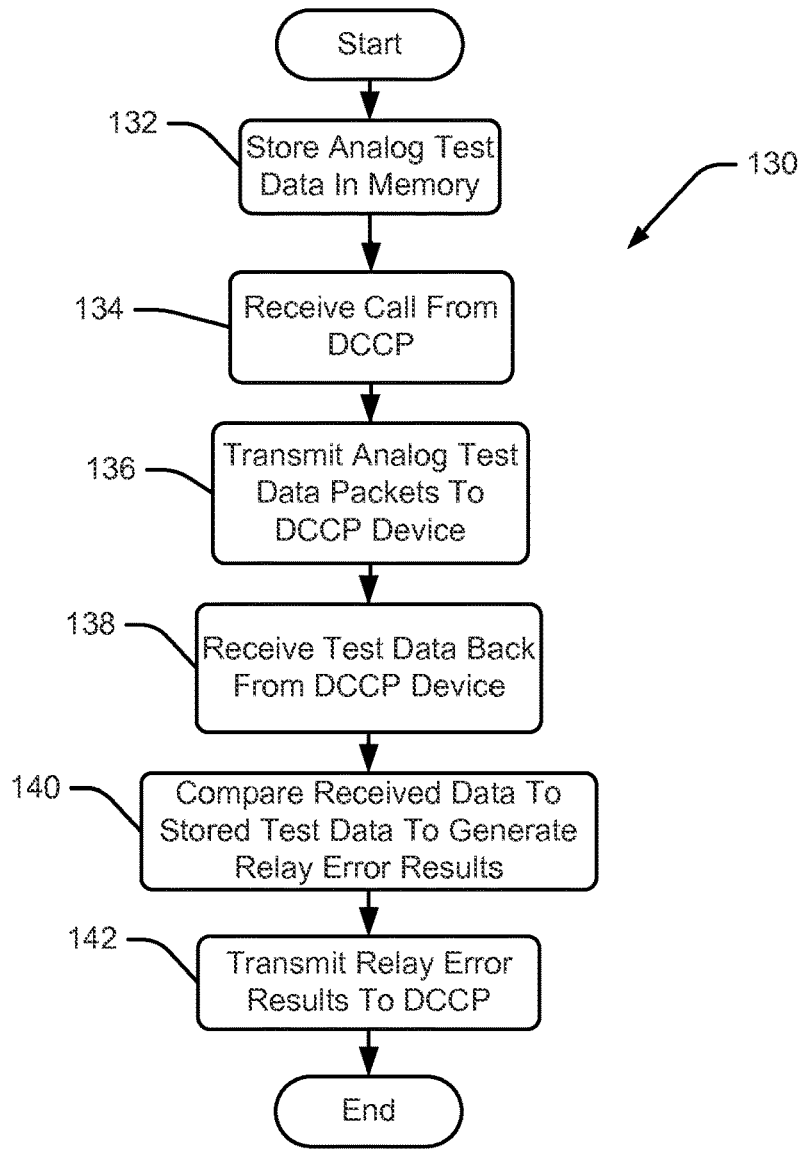
FIG. 7 is a flow chart illustrating steps performed by a relay or relay gateway during a line quality test procedure.

In another aspect, one or more line quality tests may be performed on demand to determine if the PSTN data reliability is still adequate to support a quality CapTel connection. Here, for instance, if an assisted user notices a drop off in transcription quality, the user herself may be able to initiate a line quality determination process. For instance, the DCCP may allow a user to indicate that an error rate seems high Referring now to FIGS. 6 and 7, an exemplary process for determining if a line is suitable for PSTN communication is illustrated where FIG. 6 shows steps performed by a DCCP and FIG. 7 shows steps performed by a relay system server or other platform server or computer. At block 99 a DCCP specific serial number is assigned to a DCCP and is stored in the DCCP memory. At block 101 analog test data is stored in the DCCP memory and at block 132 analog test data is stored in the relay or other system database. At block 102 the DCCP 12 is connected to a phone line via the PSTN port 29 (see again FIG. 1). Here, the test data stored in the DCCP memory and the relay database may be identical while in other cases the data may be different.

At block 104, the DCCP dials the test modem. Here, in at least some cases the DCCP may be programmed to automatically dial the relay test modem upon initial installation and, perhaps, at other times thereafter (e.g., every night, once a week, upon user command to check line quality, etc.). Referring to FIG. 7, once a DCCP call is received at block 134, at block 136, the relay test modem transmits the stored analog test data to the DCCP. In FIG. 6, the test data is received at block 108 and at block 110 the test data stored initially by the DCCP is transmitted to relay test modem. At block 112, the DCCP compares the received test data to known correct test data to identify errors.

Referring again to FIG. 7, at block 138 the relay test modem receives the test data transmitted by the DCCP and that data is compared to known correct test data at block 140 to identify errors. At block 142 the errors or some indication of the number or errors or error rate is transmitted back to the DCCP. At block 114 the error information from the relay is received by the DCCP and at block 116 the DCCP processor determines if any of the error rates exceed a threshold level. If the error rate is less than the threshold level, control passes to block 118 where the DCCP is programmed to operate in the PSTN mode (see FIG. 1). If an error rate exceeds the threshold level, control passes to block 120 where the DCCP is programmed to operate in the IP mode (see FIG. 2).

In some embodiments other line quality determining processes are contemplated. For instance, instead of having each of the DCCP and the relay or modems store test data and having both determine test data error rates, in other cases only one of the DCCP and the relay may store test data for transmission to the other and only the other of the DCCP and relay may perform the testing to identify error rate. Where a relay establishes the error rate, instead of transmitting the error rate to the DCCP, a signal indicating PSTN or VOIP may be transmitted to the DCCP for setting the communication technology to be used by the DCCP.

As described above, the line quality test may be performed immediately upon initiation of the DCCP in some cases. In other cases, the line quality test may be repeated periodically or upon command by an assisted user. For instance, in some cases the line quality test may be performed every day (e.g., at 2 AM assuming the DCCP is not being used at that time). Here, where the poor line quality is detected, a notice may be presented to the user the next time the user uses the phone indicating poor quality and perhaps initiating a process whereby the DCCP is changed over to operate in the IP mode after suitable registration or other regulation requirements are met.

In still other cases it is contemplated that a state or the FCC may, at some point, regulate the number of minutes of caption services that the state or FCC will provide. In this case, for instance, if a state will only purchase a maximum of 200 minutes per week for an assisted user, the FCC may opt to pay for any minutes beyond 200 minutes of use. Here, the system may automatically switch between PSTN and IP modes when required based on minutes of use, assuming that line quality permits.

In still other cases a relay operator or administrator or other CapTel platform employee may be able to initiate a line quality test remotely. For instance, if an assisted user is not satisfied with captioning quality, the user may contact a remote platform employee and that employee may test the line quality in a manner similar to that described above by initiating transmission of test data to or from the DCCP 12 and an associated error rate calculation.

In a further aspect, a DCCP may prevent a user from switching the DCCP from a PSTN mode to an IP mode. Again, a state has the authority to authorize the use of a PSTN CapTel phone. If a state's EDP distributes a DCCP, then the DCCP is automatically approved for use by the state. VOIP CapTel phones are under the jurisdiction of FCC rules. The FCC requires that any person wanting to use VOIP captioned telephone service must first register and certify that they need to use the CapTel service to have a telephone conversation. Because there are different requirements for use of VOIP and PSTN based CapTel phone devices, an assisted user cannot be allowed to simply change a setting in a DCCP to change the DCCP from a PSTN mode to an IP mode.

To ensure that the appropriate authorization, state, federal or other has been obtained prior to captioning services being rendered, a DCCP may be programmed so that an assisted user cannot change the operating mode independent of some activity by an authorizing agency. To change from PSTN to IP mode (or vice versa), an assisted user may be required to contact an authorized agent such as a customer service representative associated with a distributer of the user's DCCP (e.g., an EDP), or a registration specialist. The authorized agent may verify that a required registration or authorization for the assisted user for a desired mode (e.g., PSTN or VOIP) is on file or has been rendered. The authorized agent may then remotely change the configuration in the DCCP via transmission of a mode setting signal to the DCCP.

In at least some cases when an agent authorizes a mode change, the operating mode setting may be changed while an assisted user is using her DCCP to speak with the agent. In other cases, the agent's authorization signal may cause the authorized mode setting to be stored in a configuration gateway database and the assisted user may be required to repeat the configuration process described above to change operating modes (e.g., the DCCP specification may specify PSTN or IP mode for an associated DCCP).

In still other cases it is contemplated that an assisted user may have obtained both state and FCC authorizations or registrations for the PSTN and IP modes and those may be recorded in some system database. Where a user has authorization to use each of a PSTN mode and an IP mode, where one mode is preferred over the other for some reason (e.g., line quality, EDP preference, etc.), changes between communication modes may be automated. Moreover, in a case where a user has both PSTN and IP mode authorizations, the user herself may be able to switch between service types by entering a service type command via the DCCP display screen.

In at least some cases a DCCP may be programmed to allow a user to seek authorization for a mode type (e.g., PSTN or IP) via the DCCP itself or to prompt the user for information required to obtain authorization. For instance, in a case where a DCCP has determined that line quality is insufficient for PSTN mode, the DCCP may be programmed to indicate line failure to an assisted user via the DCCP display screen. The failure indication may include information about the IP mode option and an on screen selectable icon for initiating an IP mode registration process. Here, where an IP mode registration is electronically stored, the system may automatically obtain the registration and automatically reconfigure to facilitate VOIP communications. In other cases selection of the on screen icon may cause a registration process to commence with the aid of a platform employee or automatically whereby a statement from the assisted user that meets regulatory requirements is presented via the DCCP display screen along with some type of "accept" icon. Here, selecting the accept icon may cause a relay server, EDP server or other server to store the user's statement to meet the regulatory requirements.

Figure 8:
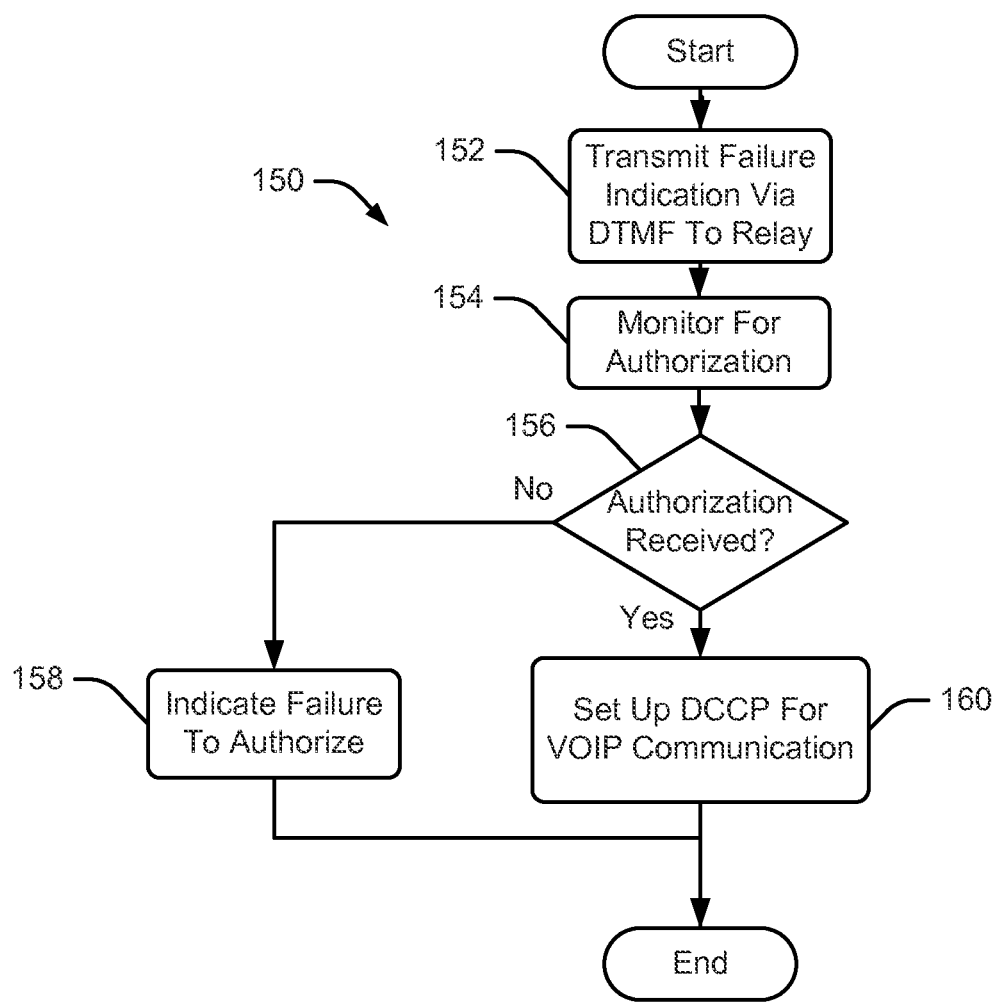
FIG. 8 is a flow chart showing steps performed by a DCCP to automatically seek registration information from a DCCP user when DCCP mode has to be changed from PSTN to IP mode.
Figure 9:
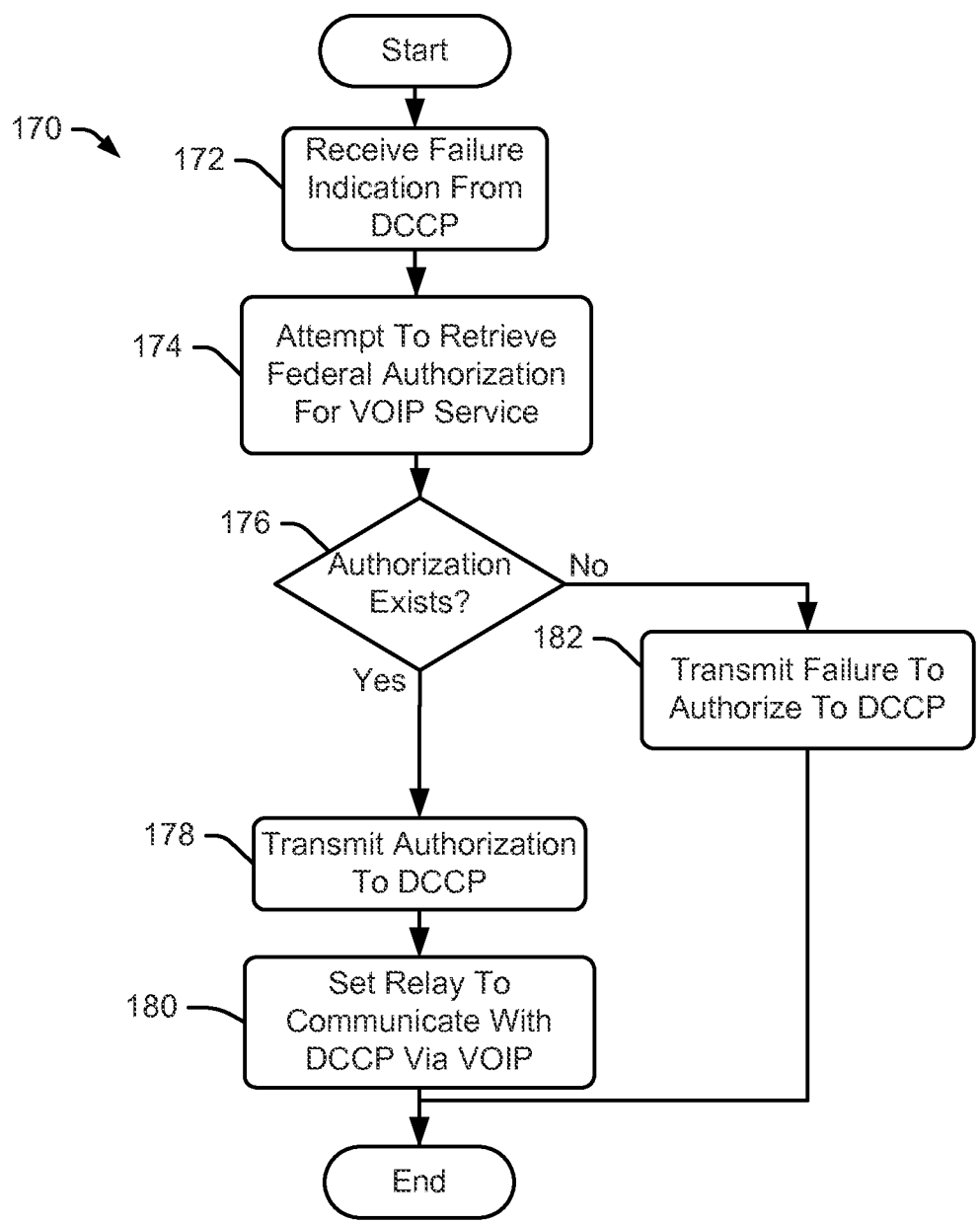
FIG. 9 is a flow chart illustrating steps performed by a relay or gateway to seek registration information for a DCCP user when DCCP mode has to be changed from PSTN to IP mode.

Referring to FIGS. 8 and 9, a process 150, 170 for seeking service type authorization is illustrated where FIG. 8 includes steps performed by a DCCP and FIG. 9 includes steps performed by a relay or other platform server. At block 152, after a line quality test fails, a line quality failure indication is transmitted via DTMF to the relay and then authorization for VOIP service is monitored at block 154. Referring also to FIG. 8, at block 172 a line quality failure indication is received. At block 174, a relay server attempts to retrieve an IP mode service registration or authorization. Again, the attempt to retrieve authorization may include searching for an electronic authorization or starting a process for obtaining authorization. At block 176, if authorization is not obtained, control passes to block 182 where a failure to authorize indication is transmitted to the DCCP. Although not shown, the failure indication at block 182 may include an explanation of the IP mode along with some statement and an accept icon to allow the user to meet FCC or other regulatory requirements associated with the IP mode. If IP mode registration is retrieved, at block 178 the registration or a signal indicating IP mode registration is transmitted back to the DCCP and at block 180 the DCCP reconfigures to communicate via the IP mode.

In yet another aspect, a DCCP may include a phone home function useful to determine the location of the DCCP so that calls can be ascribed to different responsible jurisdictions. Currently, PSTN based relay services make use of telephone network signaling to determine the originating and terminating locations for each captioned call and, therefore, who has jurisdiction over the call. For instance, network signals may be used to determine whether a call is an intrastate, interstate, international, or toll free call. If a determination is made that a call is an intrastate call, a determination may be made as to which state the call originated from.

With current VOIP communications it is not possible to reliably determine the location of each end point of a call. VOIP CapTel phones cannot reliably provide this information because most IP addresses are dynamically assigned and are not related to an attached voice telephone line. Nevertheless, the states and the FCC would like to have the same type of summary reports for VOIP based calls that they get for PSTN calls showing the various call types as described above.

To provide additional DCCP location information to the states or other regulatory entities, a DCCP may be programmed to automatically dial a relay system phone number for a "phone home" relay gateway and report its DCCP specific serial number. Special telephone network equipment located in the relay may respond to the "phone home" call recording the DCCP serial number and the telephone network's Calling Party Number associated with the call. A calling Party Number or a similar function called Automatic Number Identification (ANI) may be used to determine the location of the DCCP telephone. The DCCP may use a DTMF signaling protocol to provide the serial number to the relay recording function as this method is generally reliable on both PSTN and IP connections.

The phone home function may also be combined with the VOIP connection to correlate the IP address for a DCCP operating in IP mode with the telephone number connected to the voice service line or with the location of the DCCP as established during the phone home process. To do this, as described above, the DCCP may automatically dial a special toll free number on the PSTN network for the phone home relay gateway. The gateway may request the DCCP specific serial number from the DCCP and may then correlate and save the DCCP serial number along with the calling party number or a location derived from the calling party number information in a system database for subsequent use.

After the calling party number or DCCP location and the DCCP serial number have been stored, each time the DCCP connects to the relay platform in the future using VOIP, the relay platform may automatically receive or obtain the DCCP IP address and electronic serial number. The electronic serial number may then be used to lookup the DCCP location in the database which can then be associated with the DCCP IP address and the call in general for jurisdictional or type assignment purposes. This method may provide or be useable to determine complete information about where the DCCP is installed. Again, DTMF may be used to send the identification number or other data over the voice telephone connection because all types of residential telephone service (PSTN and VOIP) are known to reliably carry DTMF signals.

Figure 10:
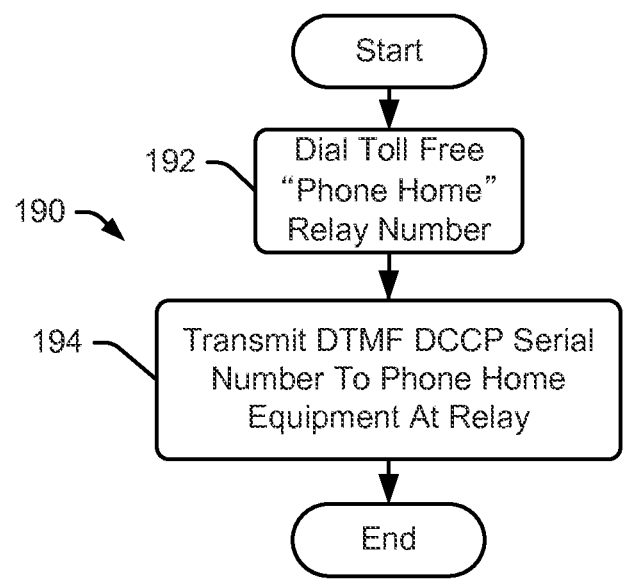
FIG. 10 is a flow chart illustrating steps performed by a DCCP to facilitate a phone home process enabling a relay or gateway to establish where a DCCP is installed even when the DCCP communicated in an IP mode.
Figure 11:
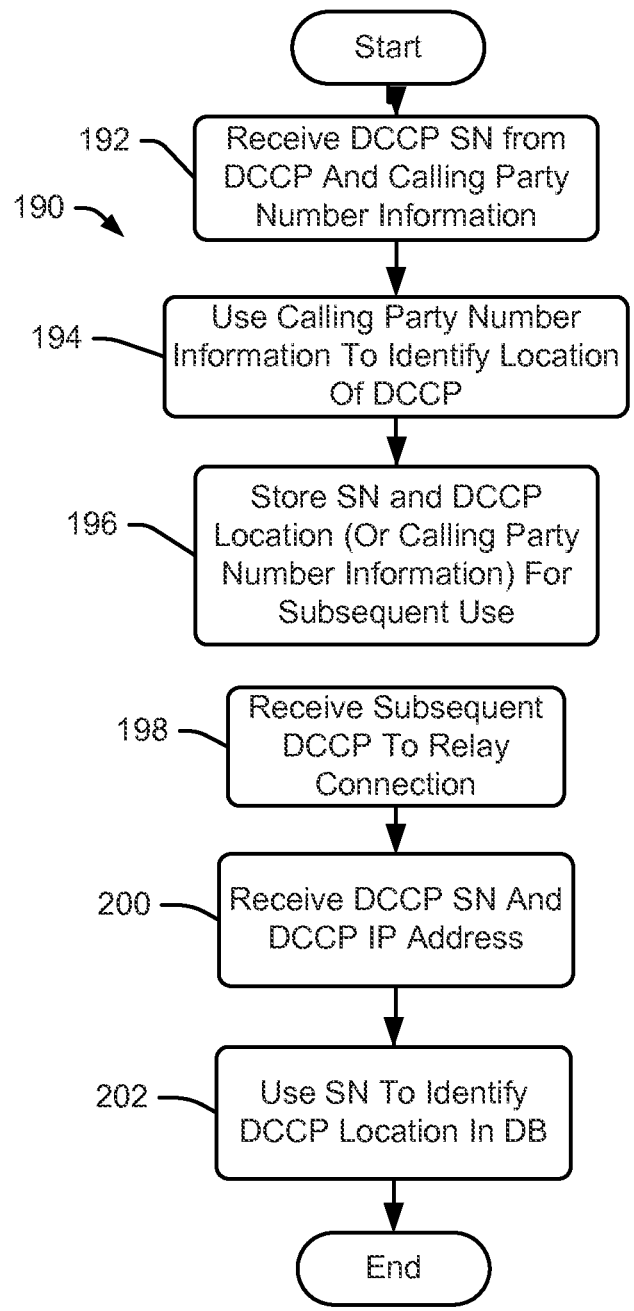
FIG. 11 is a flow chart illustrating steps performed by a relay or gateway to facilitate the phone home process.

Referring now to FIGS. 10 and 11, a process 190, 210 for associating DCCP location with an IP address or a call is shown where FIG. 10 shows steps performed by a DCCP and FIG. 11 shows relay or other platform server steps. At block 192, a DCCP dials a relay "phone home" number. At block 194 the DCCP transmits a DTMF DCCP specific serial number to the relay equipment. In FIG. 11, the DCCP specific serial number is received at 192. At block 194, the relay equipment obtains or captures the calling party number information from the phone service provider. At block 194, the relay uses the calling party number to identify location of the DCCP and at block 196 the relay stores the DCCP specific serial number and the DCCP location for subsequent use. At block 198, when a subsequent call is received at the relay from the DCCP, the DCCP again provides the DCCP specific serial number as well as an IP address assigned to the DCCP. At block 202 the relay uses the serial number to look up the location of the DCCP in the database and the location is thereafter associated with the DCCP IP address.

The DCCP may automatically perform the "phone home" function upon receiving a command from the CapTel platform to do so or the DCCP may be told to perform the "phone home" function at prescribed intervals, such as daily, weekly, or monthly. The DCCP may also be directed to perform the "phone home" function at a specific time of day perhaps during the late evening or early morning so as not to interfere with other use of the DCCP. The CapTel platform may automatically respond to the "phone home" function. Moreover, the DCCP may store up to date records of the DCCP's IP address and telephone number or even a location of the DCCP provided by the CapTel platform or entered into the DCCP by an installer or an assisted user.

When a DCCP using VOIP is used to place a call with captions ON, the DCCP may store the number entered by the assisted user to initiate the call (e.g., the phone number of a hearing user's phone or target device). The DCCP may further report the stored number to the captioning relay at the start of the call. The captioning relay may store the dialed number in call detail records created for each captioned call. As noted above for PSTN based relay services, the states and federal government use the originating number and the dialed number to determine a jurisdiction associated with each PSTN based call. Using the phone home function described above and recording the dialed number may allow the relay service or some other entity or service to assign a jurisdiction to the call using the same rules used by PSTN CapTel. In at least some cases, without the phone home function, it will not be possible to determine the intrastate, interstate jurisdiction for IP CapTel calls.

In at least some embodiments a DCCP using VOIP communication will be programmed to store any Caller-ID information received during an inbound call. Moreover, the DCCP may be programmed to report Caller-ID or other identifying information to the captioning service platform so that the information can be recorded in a call detail record. While Caller-ID is not always present on a telephone line and can be blocked by the caller, it is still useful to record and provide the Caller-ID information for each call when it is available.

In other cases a different version of the phone home concept is contemplated where the calling party number is correlated with an electronic serial number of a DCCP so that the calling party number can be associated with a network address when a subsequent call is received. In this regard, the phone home function can be combined with the IP connection to correlate the IP address for a Captel phone operating in IP mode with the telephone number connected to a voice service line. To do this, the Captel phone may automatically dial a special toll free number on the PSTN network to a "Phone Home gateway" at the relay. The gateway will save the calling party number and then request the electronic serial number from the DCCP. Once the gateway has both the electronic serial number and calling party number, it will store them in a Captel database where it can be accessed later.

The Captel platform automatically receives the DCCP IP address and electronic serial number each time the DCCP connects to the Captel platform. The electronic serial number can be used to associate the telephone number collected during a 'phone home" operation with the IP address collected during a captioning session. This provides a complete picture of where the DCCP is installed.

The Captel phone can automatically perform the "phone home" upon receiving a command from the Captel platform to do so or the phone can told to perform the "phone home" function at prescribed intervals, such as daily weekly, or monthly. The Captel phone can also be directed to perform the "phone home" function at a specific time of day perhaps during the late evening or early morning so as not to interfere with other use of the Captel phone. The Captel platform will automatically respond to the "phone home" function and keep up to date records of the Captel phone's IP address and telephone number.

When an IP Captel phone user places a call with captions ON, the IP Captel phone stores the number the user dialed and reports this to the caption service at the start of the call. The captioning service stores and reports the dialed number in the call detail records created for each captioned call. As noted above for PSTN based relay services the states and federal government use the originating number and dial to number to determine the jurisdiction for the call. Using the phone home function described above and recording the dialed number will allow Captel to assign a jurisdiction to the call using the same rules used by PSTN Captel. Without the phone home function it has not possible to determine the intrastate, interstate jurisdiction for IP CTS calls.

The present invention has been described in terms of one or more preferred embodiments, and it should be appreciated that many equivalents, alternatives, variations, and modifications, aside from those expressly stated, are possible and within the scope of the invention.

While present inventive concepts have been described with reference to particular embodiments, those of ordinary skill in the art will appreciate that various substitutions and/or other alterations may be made to the embodiments without departing from the spirit of present inventive concepts. Accordingly, the foregoing description is meant to be exemplary, and does not limit the scope of present inventive concepts.

A number of examples have been described herein. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. As another example, referring again to FIG. 2, in a case where an assisted user has VOIP service, an all VOIP system may be set up where all communications between the router 41 and the DCCP 12 are via either the Ethernet port 31 or the wireless transceiver or both so that the PSTN port is non-functional. As one other example, as described above, other line quality tests are contemplated and other tests for automatically determining or discerning communication mode (e.g., PSTN or IP) available for use by an assisted user are contemplated.

Accordingly, other implementations are within the scope of the present inventive concepts.

What is claimed is:

1. A method of operating a captioned telephone, comprising:
    storing analog test data in a captioned telephone memory;
    dialing a telephone number to a relay gateway;
    connecting to the relay gateway over a communication network; and
    performing a test of communication network quality using the test data to determine if the network is sufficient to carry analog data, the test including at least one of transmitting the test data to the relay gateway and receiving test data from the relay gateway via the communication network;
    wherein the network is one of a POTS network and a VOIP network.

2. The method of claim 1 further including the step of, when the network quality is sufficient to carry analog data, setting up the captioned telephone to operate in a PSTN mode in which data is communicated between the captioned telephone and the relay gateway via analog transmission.

3. The method of claim 1, wherein the step of performing a test includes transmitting the analog test data to the relay gateway and receiving test data transmitted from the relay gateway and comparing the received test data to the stored analog test data to identify errors in the received test data, and wherein when a number of errors exceeds a threshold value, determining that the network quality is insufficient to carry analog data.

4. The method of claim 3 further including the step of, when the network quality is sufficient to carry analog data, setting up the captioned telephone to operate in a PSTN mode in which data is communicated between the captioned telephone and the relay gateway via analog transmission.

5. The method of claim 1 further including the steps of, when the network quality is insufficient to carry analog data, setting up the captioned telephone to operate in an IP mode in which data is communicated between the captioned telephone and the relay gateway via the internet.

6. The method of claim 5 further comprising verifying that an assisted user is registered to use the IP mode prior to setting up the IP mode operation.

7. The method of claim 1, wherein the performing step occurs automatically when the captioned telephone is first connected to the communication network.

8. The method of claim 1, wherein the performing step is performed on-demand by a user.

9. A method for use with a captioned telephone, the method comprising the steps of:
    linking the captioned telephone to a phone line;
    automatically performing a test on the phone line to determine that the phone line is one of a PSTN line and an IP line;
    when the phone line is a PSTN line, setting up the captioned telephone to operate in a PSTN mode where information is transmitted as analog signals; and
    when the phone line is an IP line, setting up the captioned telephone to operate in an IP mode where information is transmitted on the line as digital data packets.

10. The method of claim 9 wherein the step of performing a test includes storing analog test data in a captioned telephone memory, at least one of transmitting and receiving analog test data, and determining line quality as a function of a number of errors in the test data either transmitted or received.

11. The method of claim 9 further comprising receiving a user input to perform an additional test on the phone line to determine that the phone line is one of a PSTN line or an IP line.

12. The method of claim 11, wherein the user is physically present proximate the captioned telephone.

13. The method of claim 11, wherein the user is remote from the captioned telephone.

14. A method of operating a captioned telephone, comprising:
- associating the captioned telephone with a phone line via a PSTN port and with a network router;
- attempting to establish communication between the captioned telephone and the network router;
- when the router responds to the captioned telephone, configuring the captioned telephone to operate in an IP mode; and
- when the router does not respond to the captioned telephone, configuring the captioned telephone to operate in a PSTN mode.

15. The method of claim 14, wherein the captioned telephone is associated with the network router via a wireless transceiver.

16. The method of claim 14, wherein the captioned telephone is associated with the network router via an Ethernet connection.

17. The method of claim 14, wherein after the captioned telephone is configured to operate in either an IP mode or a PSTN mode, connecting via the relevant mode to a gateway associated with a relay, identifying the captioned telephone to the gateway, and receiving configuration information specific to the captioned telephone from the gateway.

18. The method of claim 17, wherein the configuration information includes default settings related to captioning.

19. The method of claim 17, wherein the configuration information includes default settings related to a maximum allowed handset volume.

20. The method of claim 17, wherein the captioned telephone includes a unique identifier stored in memory, and wherein the identifying step includes transmitting the unique identifier to the gateway.

* * * * *